US008651701B2

(12) United States Patent
Yasuda et al.

(10) Patent No.: US 8,651,701 B2
(45) Date of Patent: Feb. 18, 2014

(54) LIGHT SOURCE DEVICE

(75) Inventors: Yukio Yasuda, Himeji (JP); Taku Sumitomo, Himeji (JP); Masaki Kato, Himeji (JP)

(73) Assignees: Ushio Denki Kabushiki Kaisha, Tokyo (JP); Energetio Technology, Inc., Woburn, WA (US)

( * ) Notice: Subject to any disclaimer, the term of this patent is extended or adjusted under 35 U.S.C. 154(b) by 916 days.

(21) Appl. No.: 12/640,587

(22) Filed: Dec. 17, 2009

(65) Prior Publication Data

US 2010/0164347 A1 Jul. 1, 2010

(30) Foreign Application Priority Data

Dec. 27, 2008 (JP) ................................ 2008-335360

(51) Int. Cl.
*G02B 27/20* (2006.01)
*G21G 4/00* (2006.01)

(52) U.S. Cl.
USPC ....................................... 362/259; 250/493.1

(58) Field of Classification Search
USPC .......................... 362/259; 250/493.1; 313/46
See application file for complete search history.

(56) References Cited

U.S. PATENT DOCUMENTS 7,705,331 B1 * 4/2010 Kirk et al. ................. 250/493.1
2007/0001131 A1 1/2007 Ershov et al.
2007/0228288 A1 10/2007 Smith
2007/0228300 A1 10/2007 Smith

FOREIGN PATENT DOCUMENTS

GB 2 151 808 A 7/1985
JP 61-193358 A 8/1986

OTHER PUBLICATIONS

European Patnet Office Search Report Dated Jan. 31, 2012 for Application No. 09 01 5654 Corresponds to Present Application (Two References US 2007/228300 and JP 61-193358 on EP Search Report Had Been Previously Filed in an IDS Filed Dec. 17, 2009 for This U.S. Appl. No. 12/640,587).

* cited by examiner

*Primary Examiner* — Toan Ton
*Assistant Examiner* — Zachary J Snyder
(74) *Attorney, Agent, or Firm* — Roberts Mlotkowski Safran & Cole, P.C.; David S. Safran

(57) ABSTRACT

A light source device that irradiates a discharge vessel with a laser beam to produce radiant light that is reflected by an ellipsoidal reflecting surface efficiently utilizes the light produced by directing the laser beam through an unirradiated region where reflected light from the ellipsoidal reflector is blocked by the discharge vessel, through an opening side of the ellipsoidal reflector to the discharge vessel. The discharge vessel has an emission substance enclosed inside which is excited by the laser beam and produces radiant light, is arranged at a focal point of the ellipsoidal reflector. A planar mirror, with which radiant light reflected by the ellipsoidal reflector is reflected in a different direction has a window in an unirradiated region where reflected light from the ellipsoidal reflector is blocked by the discharge vessel through which the laser beam passes to the discharge vessel.

7 Claims, 11 Drawing Sheets

LIGHT SOURCE DEVICE

BACKGROUND OF THE INVENTION

1. Field of Invention

The present invention relates to a light source device incorporated into an exposure device utilized in a manufacturing process for a semiconductor or a liquid crystal substrate, for a color filter, and the like.

2. Description of Related Art

In a manufacturing process for a semiconductor, a liquid crystal substrate or a color filter, shortening of treatment time and batch exposure of articles to be treated having a large surface area are in demand. In response to this demand, a high-pressure discharge lamp with greater ultraviolet light emission intensity into which a large input power can be entered is proposed. However, when the input power into the high-pressure discharge lamp is increased, the load on the electrodes is increased and the problem results that the high-pressure discharge lamp is blackened due to materials evaporating from the electrodes so that a short lifespan results.

FIG. 13 shows a light source device as described in JP-A-61-193358. As shown in FIG. 13, this light source device 100 is a device where an electrodeless discharge lamp 104 is arranged within an ellipsoidal reflector 101; a laser beam is radiated into the discharge vessel of the discharge lamp 104 via a hole 102 in the side surface of the ellipsoidal reflector 101; and the discharge gas enclosed within the discharge vessel is excited and produces light. In this light source device 100, because there is no electrode in the discharge lamp 104, the problem mentioned above can be solved.

However, the light source device 100 described in JP-A-61-193358 has the light entrance hole 102 and a light exit hole 103 for the laser beam in the side surface of the ellipsoidal reflector 101, and when ultraviolet radiation generated from the electrodeless discharge lamp 104 is focused by the ellipsoidal reflector 101, because of the holes 102, 103 on the reflecting surface, there is the problem that the ultraviolet radiation cannot be efficiently utilized. Further, the laser beam enters into the electrodeless discharge lamp 104 from a direction intersecting the optical axis X of the ellipsoidal reflector 101, and the discharge extends in a lateral direction (direction intersecting with the optical axis X), and the discharge occurs even in a region shifted from the focal point of the ellipsoidal reflector 101. This causes the problem that the ultraviolet radiation cannot be efficiently utilized because the ultraviolet radiation is not accurately reflected.

FIG. 14 shows a light source device as is described in US 2007/0228300 A1. As shown in FIG. 14, this light source device 200 is a device where an electrodeless discharge lamp is arranged within a reflector 201 and a laser beam enters into the discharge vessel 203 of the discharge lamp via an opening 202 at the apex of the reflector 201, and discharge gas enclosed in the discharge vessel 203 is excited and produces light. In this light source device 200, because there is no electrode in the discharge lamp, the above mentioned problem can be solved.

In the light source device 200 described in US 2007/0228300 A1, the laser beam entering into the reflector 201 from the opening 202 at the apex of the reflector 201 is reflected by the discharge vessel 203 and the discharge 204 is generated. However, a portion of the laser beam passes through the discharge 204 and passes through the discharge vessel 203, as well, and the laser beam is radiated onto the irradiation surface along with the radiant light generated by the discharge. Consequently, the problem results that the article to be treated on the irradiation surface is damaged due to this undesired effect by the laser beam.

FIGS. 15 &16 show configurations for the purpose of solving the problem of the light source device 200 shown in US 2007/0228300 A1. In the configuration shown in FIG. 15, a laser beam entering from the opening side for emitting light from the reflector 205 is reflected by the reflector 206; is radiated into the reflector 205; discharge gas filled in the discharge vessel is excited and discharge is generated; and the light generated by the discharge is reflected by the reflector 208 and is emitted.

In the configurations shown in FIGS. 15 & 16, the problem in the light source device shown in FIG. 14 can be solved. However, in the configurations shown in FIGS. 15 & 16, the reflectors 206, 208 require wavelength selectivity and manufacturing is difficult, and there are cases where the cutting of the wavelengths cannot be accurately done. In addition, a part of the radiant light is absorbed by the reflector 206 and a part of the radiant light is absorbed by the reflector 208; therefore, there is the problem that the radiant light cannot be efficiently utilized.

SUMMARY OF THE INVENTION

Taking the above mentioned problems into consideration, a primary object of the present invention is to provide a light source device that radiates a laser beam into a discharge vessel so as to cause radiant light to be emitted from the discharge vessel, wherein the light emitted from the discharge vessel is reflected by an ellipsoidal reflecting surface and the reflected light can be efficiently utilized, by introducing the laser beam by utilizing a region which is not irradiated with light due to reflected light from the ellipsoidal reflector being blocked by the discharge vessel.

In the present invention, for the purpose of solving the previously mentioned problems, the means mentioned below have been adopted.

The first aspect of the invention relates to a light source device, comprising an ellipsoidal reflector, a discharge vessel having an emission substance enclosed therein, the discharge vessel being arranged at a focal point of the ellipsoidal reflector, a laser for generating a laser beam, means for converging the laser beam toward an opening side of the ellipsoidal reflector for irradiating and exciting the emission substance for causing light to be emitted from the discharge vessel; and a planar mirror positioned to receive emitted light reflected by the ellipsoidal reflector and for changing the direction of the reflected light, wherein the planar mirror comprises a window in an area in a region not irradiated with reflected light where the reflected light from the ellipsoidal reflector is blocked by the discharge vessel; and wherein the laser is arranged to cause the laser beam to pass through said window.

In a preferred embodiment of the invention, the light source device of the first aspect, comprises a collecting lens for focusing the laser beam arranged between the planar mirror and the discharge vessel.

In another preferred embodiment of the invention, the light source device of the first aspect has a collecting lens for focusing the laser beam arranged at the opposite side from the discharge vessel for the window.

In another preferred embodiment of the invention, the light source device of the first means has a collecting reflector for collecting and reflecting the laser beam arranged at the opposite side from the discharge vessel for the window.

In yet another preferred embodiment of the invention, the light source device of the first means has a collecting lens part for focusing the laser beam formed in a portion of the discharge vessel.

In still another preferred embodiment of the invention, the light source device comprises a discharge vessel which is an electrodeless discharge vessel not having any electrodes within the discharge vessel.

In an alternative embodiment of the invention, the light source device comprises a discharge vessel having a pair of electrodes inside.

In another preferred embodiment of the invention, in the light source device having an electrodeless discharge vessel, the laser beam introduced into the discharge vessel is a laser beam from a pulsed laser for initiating discharge start-up or a laser beam from a pulsed laser or a CW laser for discharge maintenance.

In the case of a discharge vessel having electrodes arranged therein, the light source device of another preferred embodiment comprises a pulsed laser or a CW laser for introducing a laser beam into the discharge vessel for discharge maintenance.

In another preferred embodiment of the invention, the discharge vessel has heating means.

Further, the heating means preferably is a heating element that absorbs the laser beam introduced into the discharge vessel and generates heat.

EFFECT OF THE INVENTION

According to the present invention, since the laser beam to be introduced into the discharge vessel is introduced from a window placed in a region which is not irradiated by the reflected light, where the reflected light from the ellipsoidal reflector is blocked by the discharge vessel and to which the reflected light will not be radiated, and there is a planar mirror for changing the direction of the reflected light from the ellipsoidal reflector, the radiant light emitted from the discharge vessel is reflected by the ellipsoidal reflector and the reflected light can be efficiently utilized. In addition, since the laser beam is irradiated toward the discharge vessel from the opening side of the ellipsoidal reflector, the laser beam will never be directly radiated to the article to be treated on the irradiation surface, and the article to be treated will not be damaged by the laser beam.

DETAILED DESCRIPTION OF THE DRAWINGS

Figure 1:
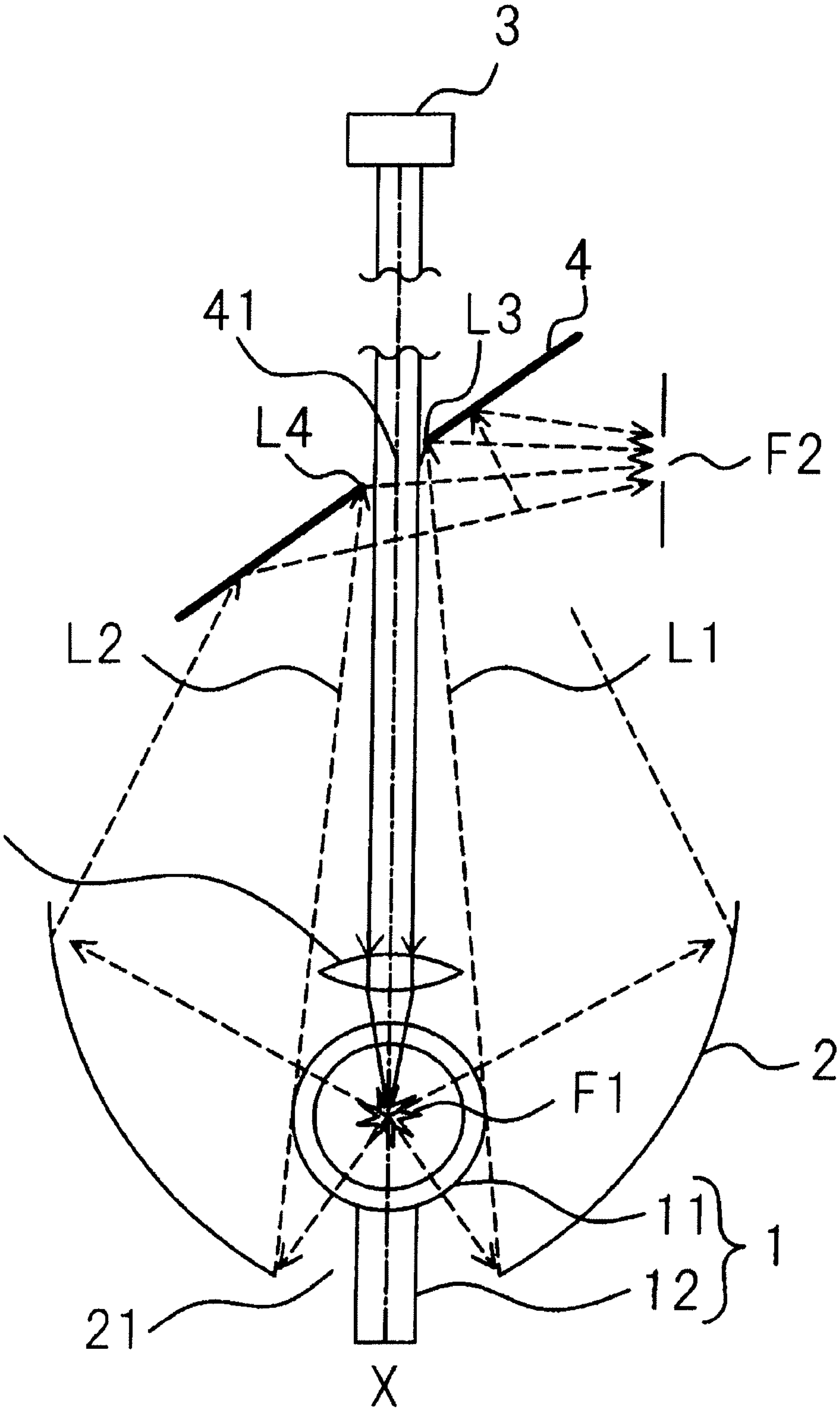
FIG. 1 shows the configuration of a light source device relating to a first embodiment of the invention.

A first embodiment of the present invention is explained using FIG. 1. FIG. 1 shows the configuration of a light source device relating to the invention of this embodiment.

As shown in FIG. 1, the discharge vessel 1 is made of quartz glass and comprised of a light-emitting part 11 and a sealing part 12, and for example, 4.5 mg/cm$^3$ of mercury and xenon at 2 atm are enclosed in the light-emitting part 11 as emission substances. The discharge vessel 1 is an electrodeless discharge vessel with no electrodes inside. An ellipsoidal reflector 2 has an apex opening 21; the sealing part 12 of the discharge vessel 21 is inserted into the apex opening 21; the sealing part 12 is retained behind the ellipsoidal reflector 2. The discharge vessel 1 is arranged at a focal point F1 of the ellipsoidal reflector 2. A laser beam generator 3 is placed outside the ellipsoidal reflector 2, and a laser beam is introduced into the discharge vessel 1 from the laser beam generator 3, for example, comprised of a 20 kHz pulsed laser or a continuous wave (CW) laser.

In the reflected light reflected by the ellipsoidal reflector 2, a region L1-L2 formed between the discharge vessel 1 and a planar mirror 4 facing the other focal point F2 of the ellipsoidal reflector 2 is a reflected light blocking region L1-L2. L1 and L2 are lines connecting the planar mirror 4 and points on the external surface of the discharge vessel 1 where its diameter is at maximum. The surface area where the reflected light blocking region L1-L2 hit the planar mirror 4 is a reflected light unirradiated region L3-L4 where the reflected light from the ellipsoidal reflector 2 is blocked by the discharge vessel 1 and which the reflected light will not reach. A window 41 is formed in the planar mirror 4 in the reflected light unirradiated region L3-L4. The laser beam emitted from the laser beam generator 3 is introduced via the window 41, and focused by a collecting lens 5 arranged between the window 41 and the discharge vessel 1 and radiated into the discharge vessel 1.

Focusing of the laser beam enables the energy density to be increased at the focal point, to excite the emission substance and to generate radiant light. The radiant light is reflected by the ellipsoidal reflector 2 and the reflected light changes its direction at the reflection surface of the planar mirror 4 except for at the window 41 and is reflected sideway onto the article to be irradiated. Furthermore, the window 41 is a through-hole formed in the planar mirror 4, and except for the through-hole, the planar mirror 4 is made of a substrate through which the laser beam will transmit, and where a reflecting film can be formed on the substrate except for at the window 41.

According to the invention of this embodiment, since the window 41 of the planar mirror 4 and the collecting lens 5 are placed in the reflected light blocking region L1-L2, a region where no reflected light from the ellipsoidal reflector 2 exists is used so that the reflected light from the ellipsoidal reflector 2 can be efficiently utilized. Further, since the laser beam is introduced into the discharge vessel 1 from the opening side of the ellipsoidal reflector 2 via the window 41, the laser beam will not be directly irradiated to the article to be treated on the irradiation surface, and the article to be treated will not be damaged by the laser beam. Further, the laser beam is designed to travel along the optical axis X of the ellipsoidal reflector 2, the discharge generated within the discharge vessel 1 extends toward the optical axis X, and the radiant light capture ratio of the ellipsoidal reflector 2 becomes higher and the radiant light can be efficiently utilized.

Figure 2:
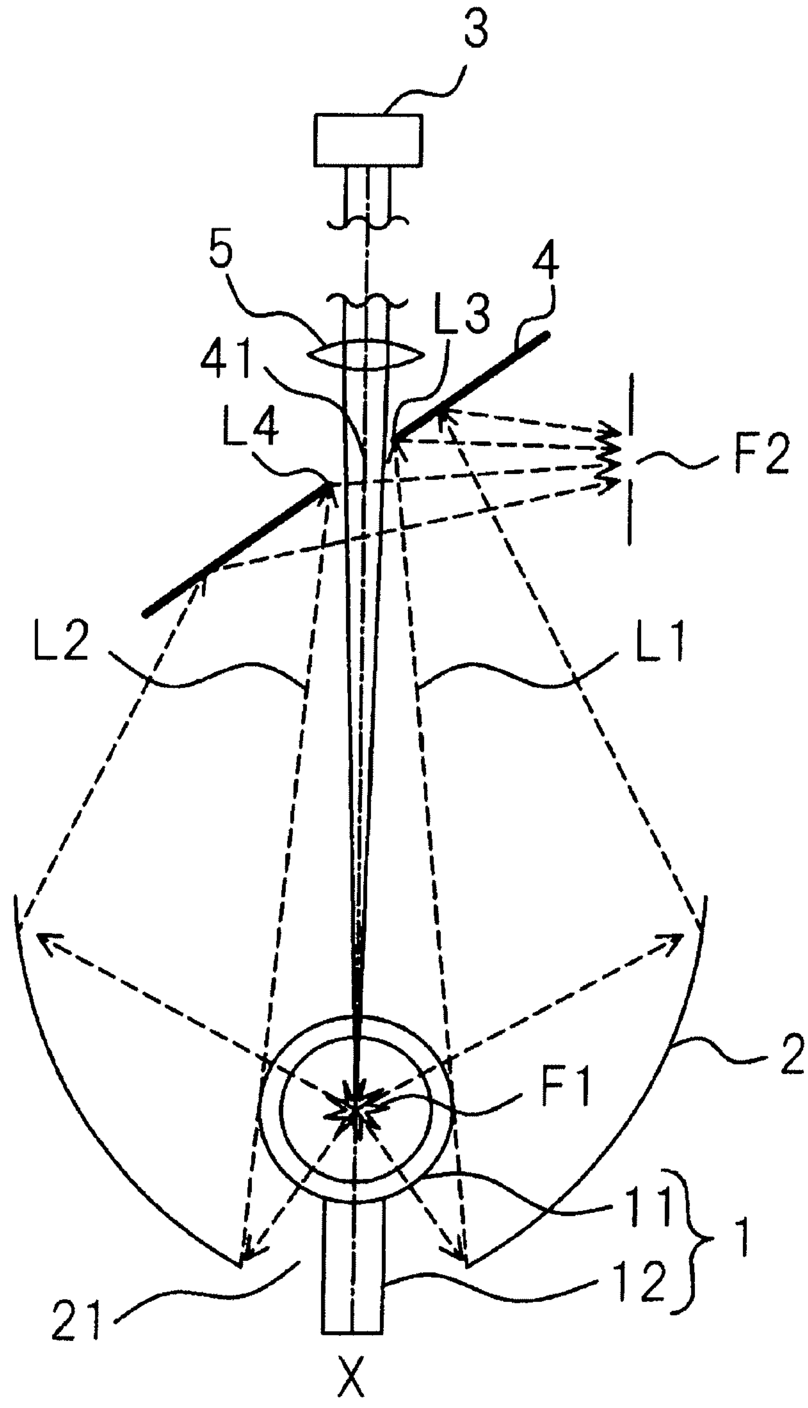
FIG. 2 shows the configuration of a light source device relating to a second embodiment of the invention.

A second embodiment of the present invention is explained with reference to FIG. 2. FIG. 2 shows a configuration of this embodiment of a light source device relating to the invention.

As shown in FIG. 2, a laser beam emitted from the laser beam generator 3 is focused by a collecting lens 5 arranged between the laser beam generator 3 and the window 41 of the planar mirror 4, is introduced via the window, and radiated into the discharge vessel 1. Focusing of the laser beam enables increased energy density at the focal point, to excite the emission substance and to generate radiant light. The radiant light is reflected by the ellipsoidal reflector 2 and the reflected light changes its direction at the reflection surface of the planar mirror 4 except for at the window 41 and is reflected sideways toward an article to be irradiated. Furthermore, other elements in FIG. 2 correspond to those of the same reference numbers shown in FIG. 1.

According to the invention of this embodiment, since the window 41 of the planar mirror 4 is placed in the reflected light blocking region L1-L2, a region where no reflected light from the ellipsoidal reflector 2 exists is used, and the reflected light from the ellipsoidal reflector 2 can be efficiently utilized. Further, since the laser beam is introduced into the discharge vessel 1 from the opening side of the ellipsoidal reflector 2, the laser beam will not be directly irradiated to the article to be treated on the irradiation surface, and the article to be treated will not be damaged by the laser beam. Also, since the laser beam is designed to travel along the optical axis X of the ellipsoidal reflector 2, the discharge to be generated within the discharge vessel 1 extends toward the optical axis X, and the radiant light capture ratio of the ellipsoidal reflector 2 is high so that the radiant light can be efficiently utilized.

Figure 3:
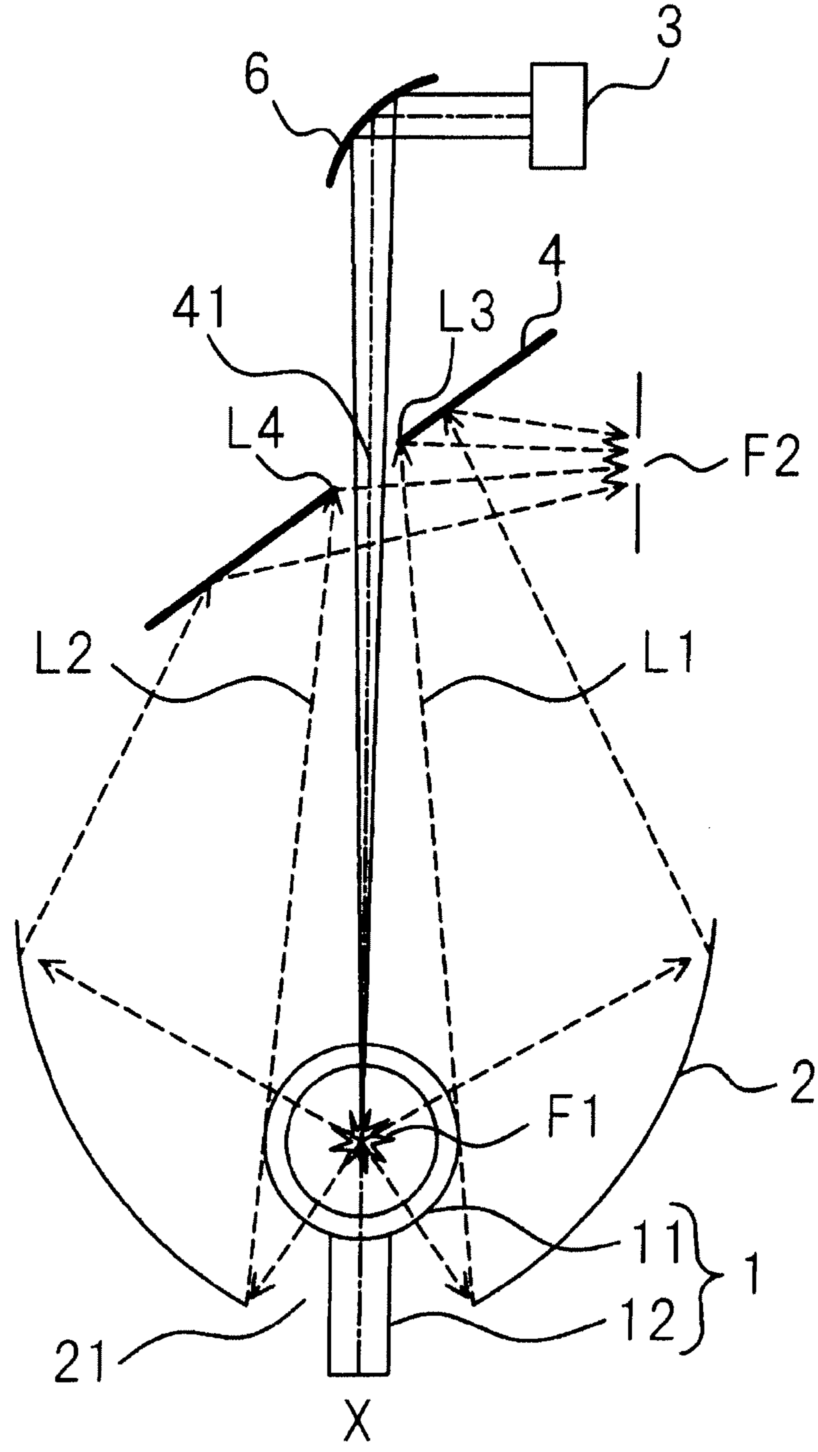
FIG. 3 shows the configuration of a light source device relating to a third embodiment of the invention.

A third embodiment of the present invention is explained with reference to FIG. 3. FIG. 3 shows a configuration of a light source device relating to this embodiment of the invention.

As shown in FIG. 3, a laser beam emitted from the laser beam generator 3 is focused and reflected by a collecting reflector lens 6 arranged between the laser beam generator 3 and the window 41 of the planar mirror 4, and the reflected light is introduced via the window 41 and radiated to the discharge vessel 1. Focusing of the laser beam enables the energy density at the focal point to be increased, to excite the emission substance, and to generate radiant light. The radiant light is reflected by the ellipsoidal reflector 2, and the reflected light changes its direction on the reflecting surface except for at the window 41 and is reflected sideways toward an article to be irradiated. Other elements correspond to those with the same reference numbers shown in FIG. 1.

According to the invention of this embodiment, since the window 41 of the planar mirror 4 is placed in the reflected light blocking region L1-L2, this utilizes a region where reflected light from the ellipsoidal mirror 2 does not exist, and the reflected light from the ellipsoidal reflector 2 can be efficiently utilized. Further, since the laser beam is introduced into the discharge vessel 1 from the opening side of the ellipsoidal reflecting via the window 41, the laser beam will not be directly radiated onto the article to be treated on the irradiation surface, and the article to be treated will not be damaged by the laser beam. Further, since the laser beam is designed to travel along the optical axis X of the ellipsoidal reflector 2, the discharge to be generated within the discharge vessel 1 extends toward the optical axis X and the radiant light capture ratio by the ellipsoidal reflector 2 is high so that the radiant light can be efficiently utilized.

Figure 4:
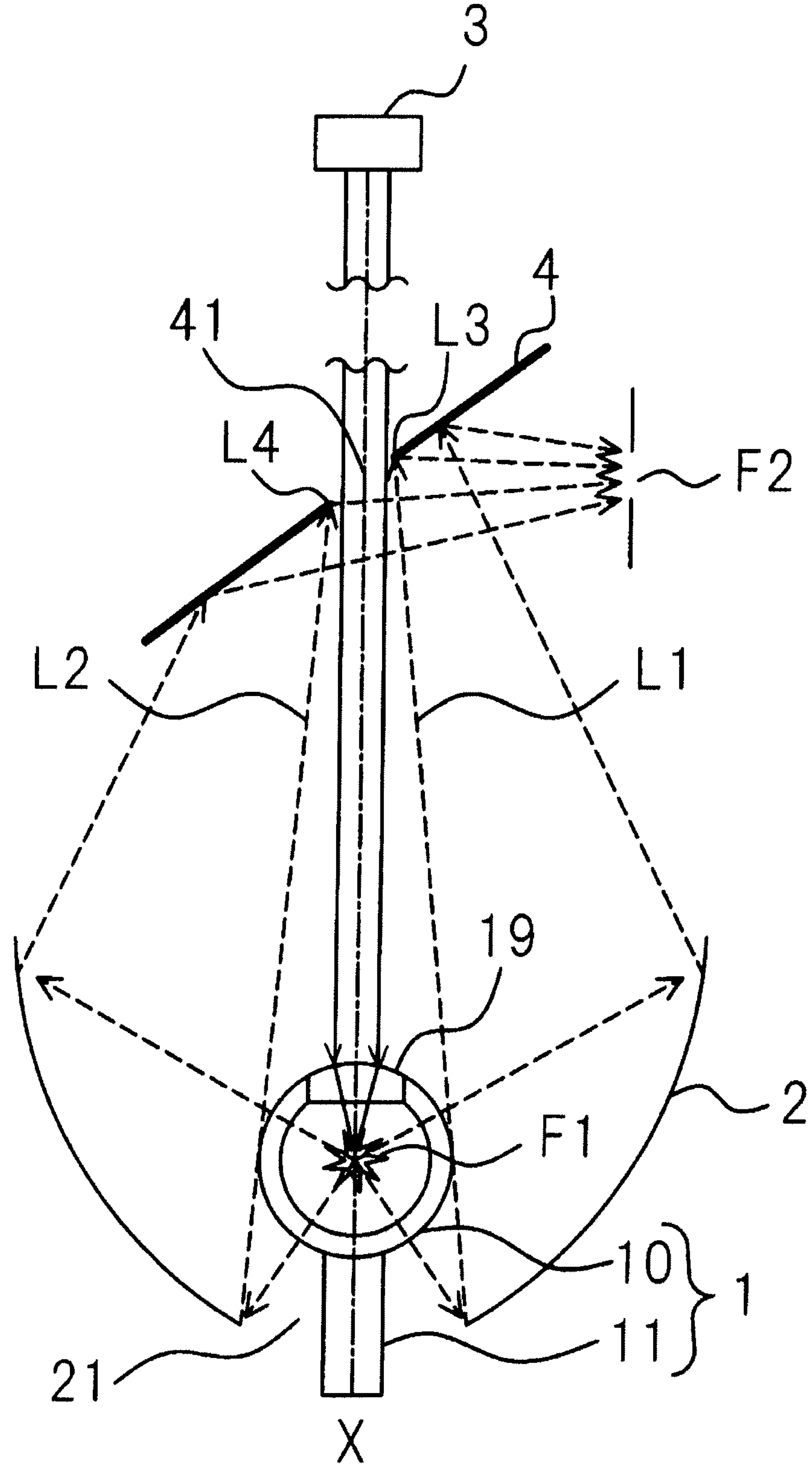
FIG. 4 shows the configuration of a light source device relating to a fourth embodiment of the invention.

A fourth embodiment of the present invention is explained with reference to FIG. 4. FIG. 4 shows a configuration of a light source device relating to this embodiment.

As shown in FIG. 4, a laser beam emitted from the laser beam generator 3 is introduced via the window 41 of the planar mirror 4, and is focused by a collecting lens part 19 formed in a portion of the discharge vessel 1 and radiated into the discharge vessel 1. Focusing of the laser beam enables the energy density at the focal point to be increased; to excite the emission substance; and to generate radiant light. The radiant light is reflected by the ellipsoidal reflector 2, and the reflected light changes its direction on the reflecting surface except for at the window 41 and is reflected sideways toward an article to be irradiated. Other elements correspond to those with the same reference numbers shown in FIG. 1.

According to the invention of this embodiment, since the window 41 of the planar mirror 4 is placed in the reflected light blocking region L1-L2, this utilizes a region where reflected light from the ellipsoidal mirror 2 does not exist, and the reflected light from the ellipsoidal reflector 2 can be efficiently utilized. Further, since the laser beam is introduced into the discharge vessel 1 from the opening side of the ellipsoidal reflector 2 via the window 41, the laser beam will not be directly radiated toward an article to be treated on the irradiation surface, so that the article to be treated will not be damaged by the laser beam. Further, since the laser beam is designed to travel along the optical axis X of the ellipsoidal reflector 2, the discharge generated within the discharge vessel 1 extends toward the optical axis X and the radiant light capture ratio of the ellipsoidal reflector 2 is high so that the radiant light is efficiently utilized.

Figure 5:
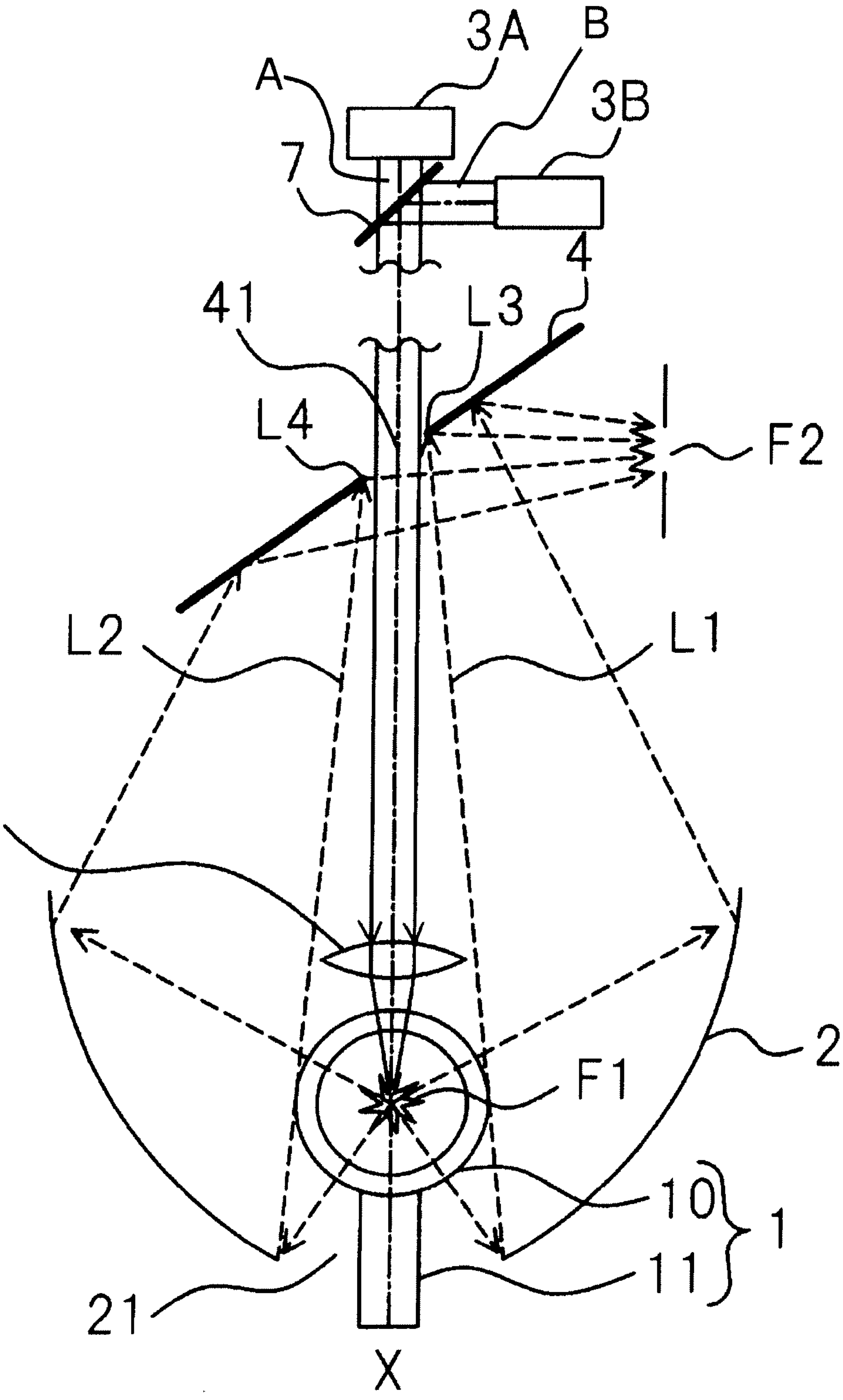
FIG. 5 shows the configuration of a light source device relating to a fifth embodiment of the invention.

A fifth embodiment of the present invention is explained with reference to FIG. 5. FIG. 5 shows a configuration of a light source device relating to this embodiment.

As shown in FIG. 5, a laser beam A that is generated by a laser beam generator 3A is transmitted through a reflector 7 and a laser beam B that is generated by a laser beam generator 3B and is reflected by the reflector 7 are focused by the collecting lens 5 arranged between the window 41 of the planar mirror 4 and the discharge vessel 1, and are radiated into the discharge vessel 1. The laser beam A is a laser beam for maintaining the discharge emitted by a CW laser, and the laser B is a laser beam for starting the discharge emitted, for example, by a 20 kHz pulsed laser. Superimposition of the laser beam B onto the laser beam A enables acceleration of the excitation of the emission substance within the discharge vessel 1, and to generate the discharge with certainty as compared to the case of irradiating only the laser beam A. Furthermore, after the discharge is stabilized, the laser beam B is stopped. Further, the operation timing of the laser beam A and the laser beam B may be either simultaneous or one after the other. Further, other than the combination mentioned above, for the laser beam A and the laser beam B, both can be beams from pulsed lasers. Furthermore, since other elements and effects of this embodiment are similar to those in the first embodiment, further explanation is omitted.

Figure 6:
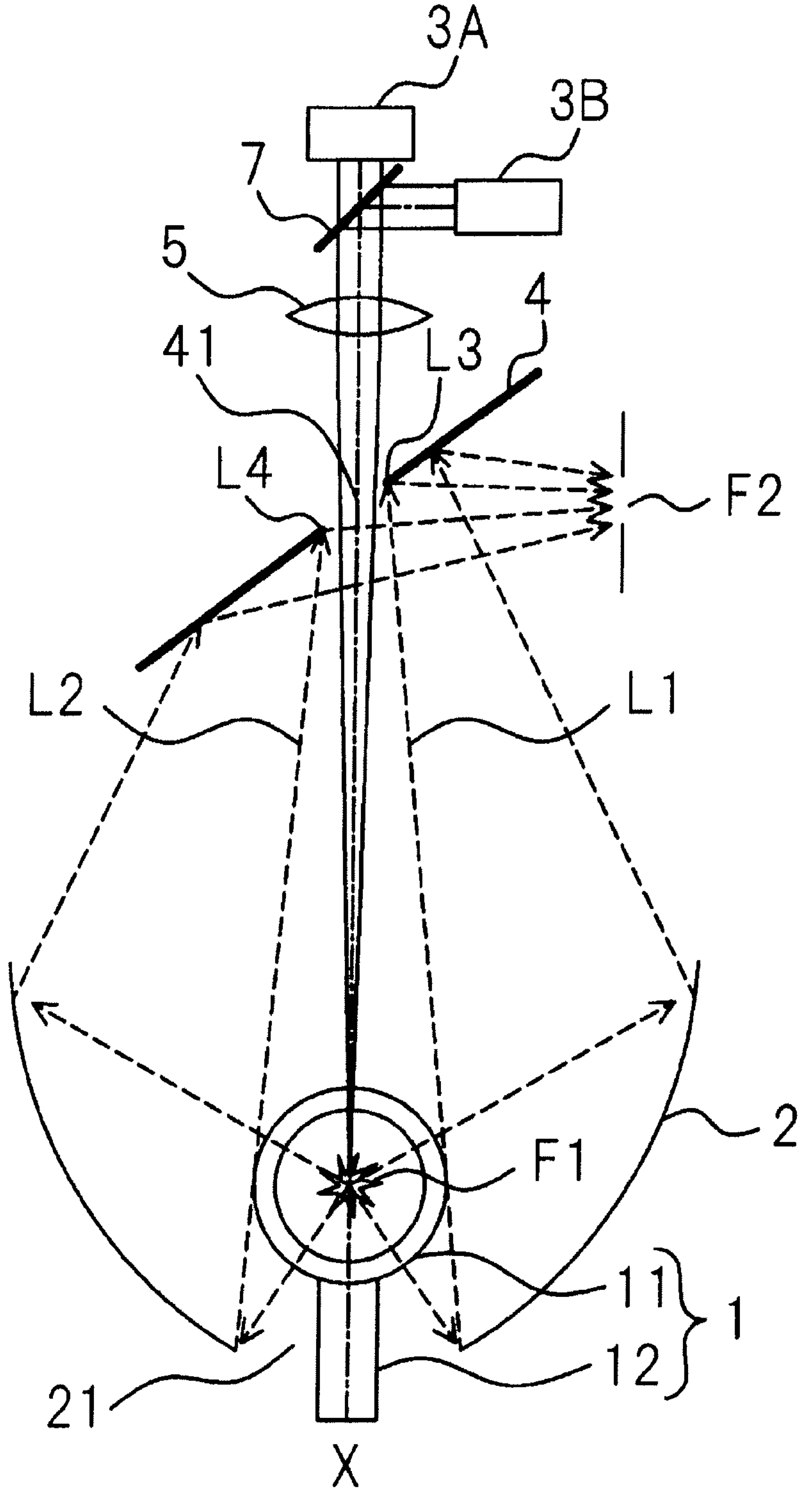
FIG. 6 shows the configuration of a light source device relating to a sixth embodiment of the invention.

A sixth embodiment of the present invention is explained with reference to FIG. 6. FIG. 6 shows a configuration of a light source device relating to this embodiment.

As shown in FIG. 6, both the laser beam A generated by a laser beam generator 3A and transmitted through the reflector 7 and the laser beam B generated by the laser beam generator 3B and reflected by the reflector 7 are focused by the collecting lens 5 arranged between the reflector 7 and the window 41 of the planar mirror 4, and are radiated to the discharge vessel 1 via the window 41. The laser beam A is a laser beam for discharge maintenance generated by a CW laser, and the laser B is a laser beam for discharge start-up generated by, for example, a 20 kHz pulsed laser. Superimposition of the laser beam B onto the laser beam A enables excitation of the emission substance within the discharge vessel 1 to be accelerated, and assures that discharge is securely generated as compared to the case of irradiating with only the laser beam A. Furthermore, after the discharge is stabilized, the laser beam B is stopped. Further, the timing of the laser beam A and of the laser beam B may be simultaneous or one may be applied after the other. Further, for the laser beam A and the laser beam B, other than the combination mentioned above, both laser beam A and the laser beam B can be generated by a pulsed laser. Furthermore, since other aspects and effects of this embodiment are similar to those in the first embodiment, further explanation is omitted.

Figure 7:
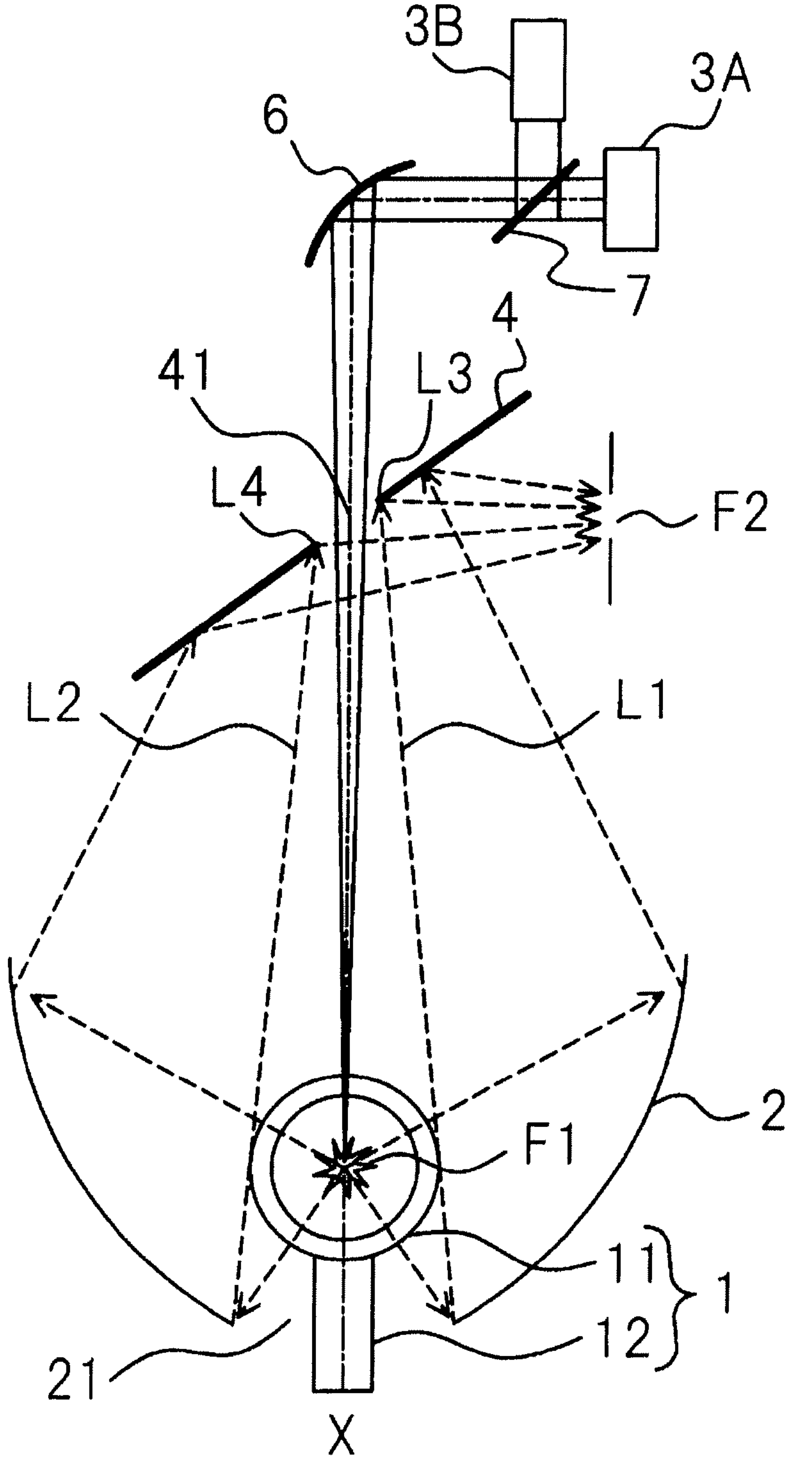
FIG. 7 shows the configuration of a light source device relating to a seventh embodiment of the invention.

A seventh embodiment of the present invention is explained with reference to FIG. 7. As shown in FIG. 7, a laser beam A is generated by laser beam generator 3A and transmitted through the reflector 7 and a laser beam B is generated by the laser beam generator 3B and reflected by the reflector 7, and both are focused by the light collecting reflector 6, and are radiated to the discharge vessel 1 via the window 41. The laser beam A is a laser beam for discharge maintenance generated by a CW laser, and the laser B is a laser beam for discharge start-up generated by, for example, a 20 kHz pulsed laser. Superimposition of the laser beam B onto the laser beam A enables the excitation of the emission substance within the discharge vessel 1 to be accelerated, and assures that discharge is securely generated as compared to the case of irradiating with only the laser beam A. Furthermore, after the discharge is stabilized, the laser beam B is stopped. Further, the application timing of the laser beam A and of the laser beam B may be simultaneous or one may be applied after the other. Also, for the laser beam A and the laser beam B, other than the combination mentioned above, both the laser beam A and the laser beam B can be generated by pulsed lasers. Furthermore, since other aspects and effects of this embodiment are similar to those in the first embodiment, further explanation is omitted.

Figure 8:
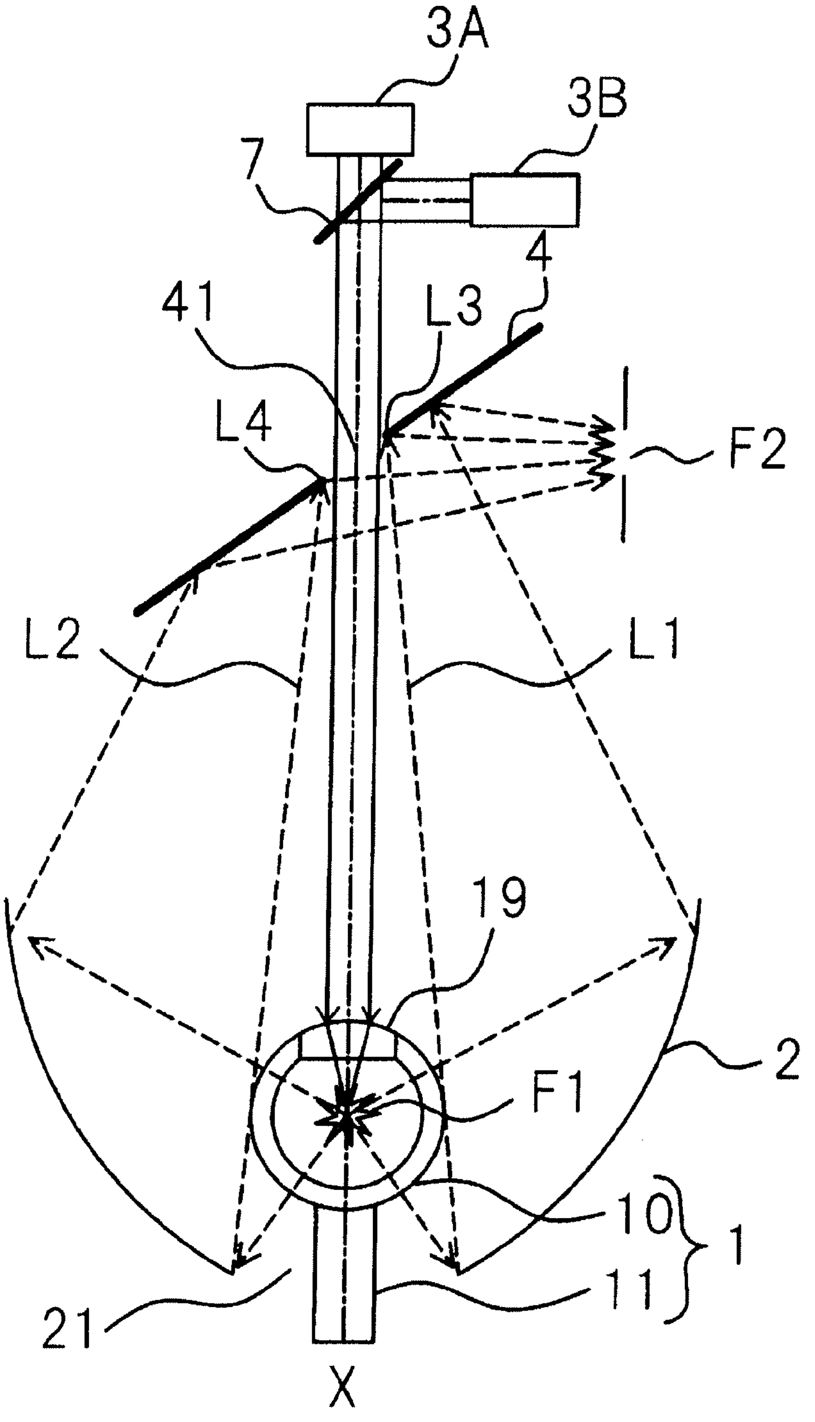
FIG. 8 shows the configuration of a light source device relating to an eighth embodiment of the invention.

An eighth embodiment of the present invention is explained with reference to FIG. 8. As shown in FIG. 8, the laser beam A is generated by a laser beam generator 3A and is transmitted through the reflector 7 and the laser beam B is generated by the laser beam generator 3B and reflected by the reflector 7, and both are passed through the window 41 of the planar mirror 4, and are collected by the collecting lens part 19 formed in a portion of the discharge vessel 1, and radiated into the discharge vessel 1. The laser beam A is a laser beam for discharge maintenance generated by a CW laser, and the laser B is a laser beam for discharge start-up generated by, for example, a 20 kHz pulsed laser. Superimposition of the laser beam B onto the laser beam A enables excitation of the emission substance within the discharge vessel 1 to be accelerated, and assures generation of discharge as compared to the case of irradiating with only the laser beam A. Furthermore, after the discharge is stabilized, the laser beam B is stopped. Also, the timing of the laser beam A and the laser beam B may be simultaneous or one may be applied after the other. Further, for the laser beam A and the laser beam B, other than the combination mentioned above, both laser beam A and the laser beam B can be generated by pulsed lasers. Furthermore, since other aspects and effects of this embodiment are similar to those in the first embodiment, further explanation is omitted.

Figure 9:
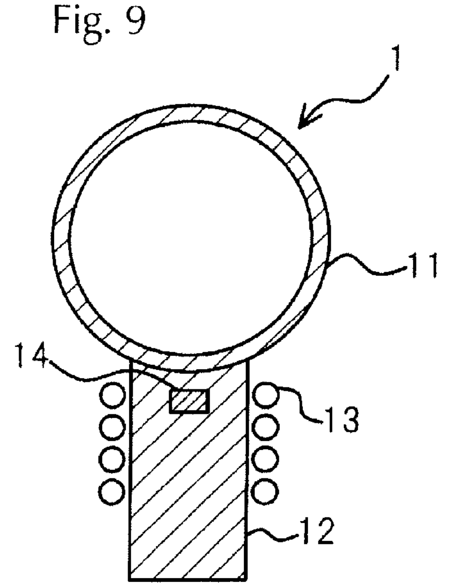
FIG. 9 shows a detailed configuration of the discharge vessel shown in the first to third embodiments and the fifth to seventh embodiments.

FIG. 9 is an enlarged sectional view of the discharge vessel 1 shown in the first to third embodiments and the fifth to seventh embodiments. As shown in FIG. 9, the discharge vessel 1 is an electrodeless discharge vessel having no electrodes within it. A heater 13 and a heating element 14 for absorbing the laser beam and generating heat are arranged on the sealing part 12 of the discharge vessel 1. The heating element 14 is formed of ferric oxide ($Fe_2O_3$) applied on pure carbon or a carbon mixture, aluminum, metal or ceramics. Further, either the heater 13 or the heating element 14 can also be placed in the discharge vessel 1. Placement of the heating means in the discharge vessel 1 enables to increase the temperature of the discharge vessel 1 and to accelerate the excitation of the emission substance.

Figure 10:
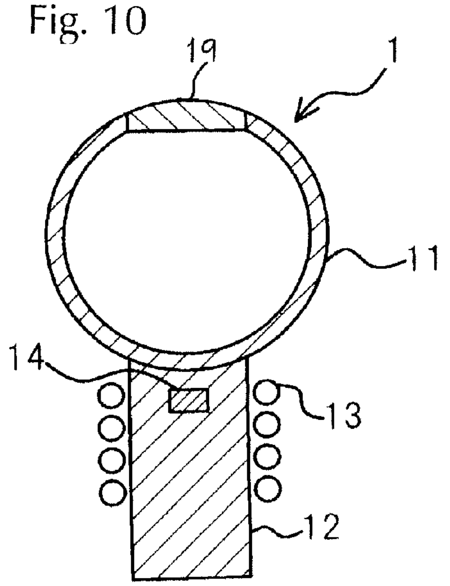
FIG. 10 shows a detailed configuration of the discharge vessel 1 shown in the fourth and eighth embodiments.

FIG. 10 shows a detailed configuration of the discharge vessel 1 shown in the fourth and eighth embodiments. As shown in FIG. 10, the discharge vessel 1 is an electrodeless discharge vessel having no electrodes inside, and the collecting lens part 19 is formed in a portion of the discharge vessel 1 for focusing the laser beam. Since the other configuration and effects are similar to those in the discharge vessel 1 explained relative to FIG. 9, further explanation is omitted.

Figure 11:
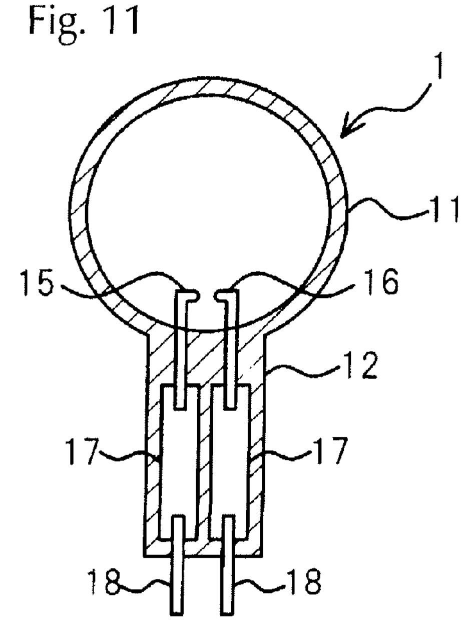
FIG. 11 shows a configuration using a discharge vessel having electrodes, instead of the electrodeless discharge vessel shown in FIG. 9, in the first to third embodiments and the fifth to seventh embodiments.

FIG. 11 shows a configuration of the discharge vessel 1 in the case of a discharge vessel having electrodes as shown in the first to third embodiments and the fifth to seventh embodiments, instead of the electrodeless discharge vessel shown in FIG. 9. As shown in FIG. 11, the discharge vessel 1 is a discharge vessel having a pair of electrodes 15, 16 within the discharge vessel 1, the electrodes 15, 16 being connected to metal foils 17 embedded in the sealing part 12, and external leads 18 connected to the metal foils 17 and projecting from the sealing part 12.

In the case of the first to third embodiments, when voltage for discharge start-up is supplied from a power source (not shown) to the external leads 18 and the voltage is applied between the electrodes 15, 16, the excitation of the emission substance within the discharge vessel 1 is accelerated and the discharge can be generated with certainty as compared to the case of only irradiating with a laser beam. Furthermore, after the discharge is stabilized, the power supplied to the electrodes 15, 16 is stopped.

In the case of the fifth to seventh embodiments, the laser beam B generated by a pulsed laser is emitted for discharge start-up; concurrently, the voltage for discharge start-up is applied to the electrodes 15, 16 and then stopped, and the laser beam A for maintaining the discharge generated by the pulsed laser or a CW laser continues to be emitted. Alternatively, the laser beam B generated by the pulsed laser is radiated for starting the discharge, and the voltage for discharge start-up is applied to the electrodes 15, 16; concurrently, irradiation by the laser beam A for discharge maintenance generated by a pulsed laser or a CW laser may occur.

Figure 12:
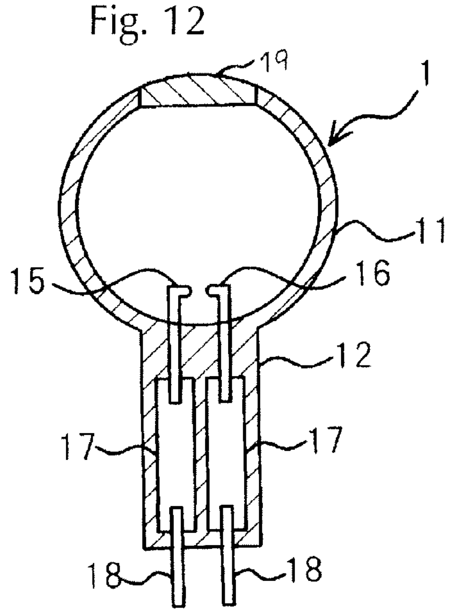
FIG. 12 shows the configuration of a discharge vessel having electrodes as the discharge vessel shown in the fifth and eleventh embodiments, instead of the electrodeless discharge vessel shown in FIG. 9.
Figure 13:
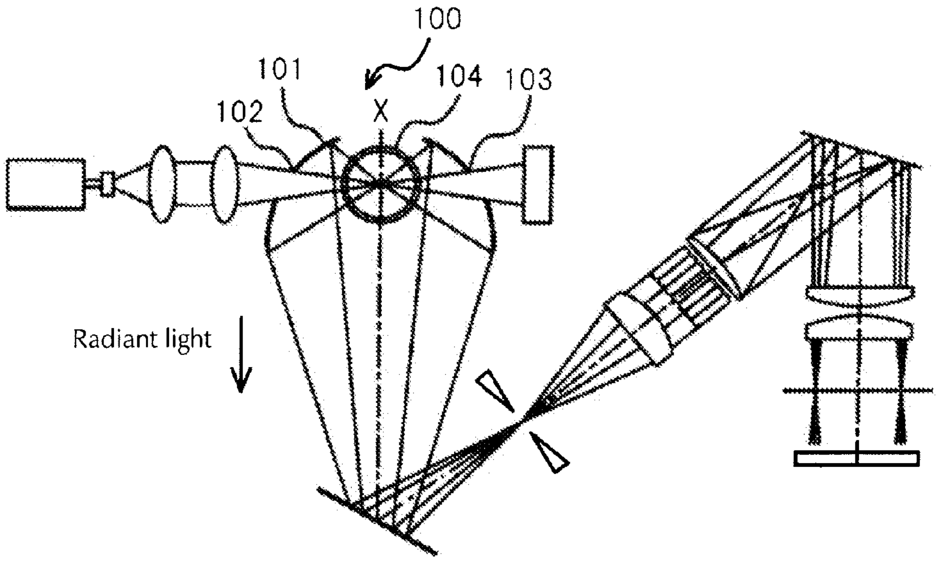
Fig. 13 (Prior Art)
FIG. 13 shows a prior art light source device.
Figure 14:
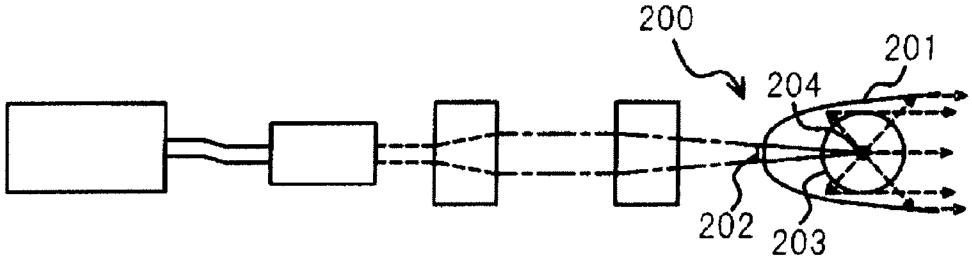
Fig. 14 (Prior Art)
FIG. 14 shows another prior art light source device.
Figure 15:
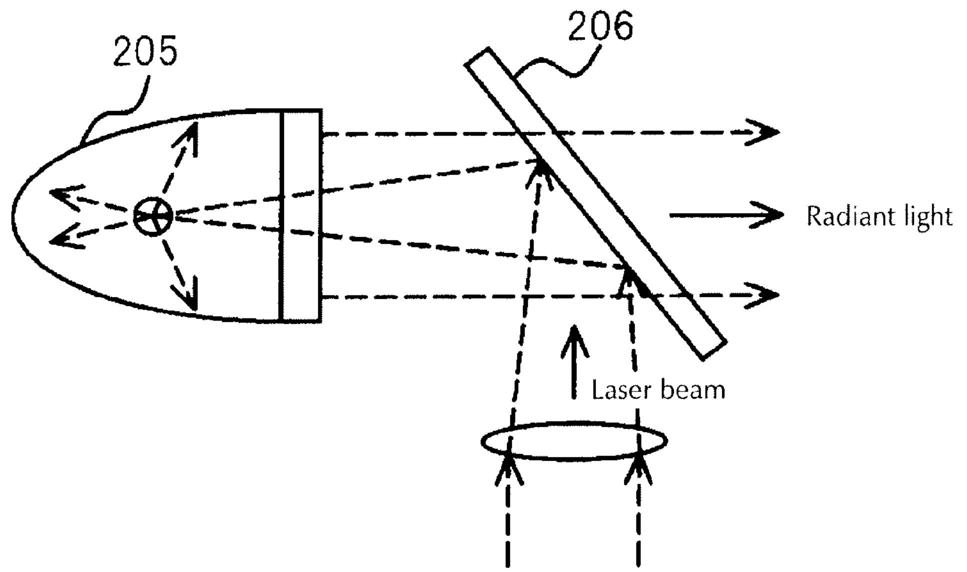
Fig. 15 (Prior Art)
FIG. 15 shows a configuration for solving the problems in the light source device of FIG. 14.
Figure 16:
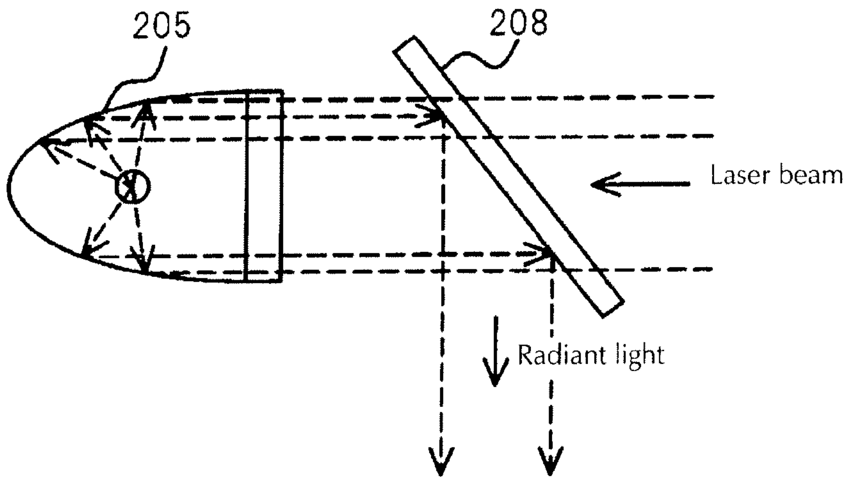
Fig. 16 (Prior Art)
FIG. 16 shows another configuration for solving the problems in the light source device of FIG. 14.

FIG. 12 shows a configuration of the discharge vessel 1 in the case of a discharge vessel having electrodes inside shown in the fifth and eleventh embodiments, instead of the electrodeless discharge vessel shown in FIG. 10. As shown in FIG. 12, the collecting lens part 19 is formed in a portion of the discharge vessel 1 for focusing the laser beam. Other aspects and effects are similar to those in the discharge vessel 1 explained with reference to FIG. 11 so that further explanation is omitted.

What is claimed is:

1. A light source device, comprising:

an ellipsoidal reflector with an opening therein, a discharge vessel having an emission substance enclosed therein, the discharge vessel being arranged at a focal point of the ellipsoidal reflector and extending into said opening of the ellipsoidal reflector, a laser for generating a laser beam, means for converging the laser beam toward an opening side of the ellipsoidal reflector for irradiating and exciting the emission substance for causing light to be emitted from the discharge vessel; and a planar mirror positioned to receive emitted light reflected by the ellipsoidal reflector and for changing the direction of the reflected light, wherein the planar mirror comprises a window in an area and of a size such that straight lines extending from edges of the window to edges of the opening of the ellipsoidal reflector are tangential to points on an external surface of the discharge vessel at a maximum diameter thereof; and wherein the laser is arranged to cause the laser beam to pass through said opening and said window.

2. The light source device according to claim 1, wherein a collecting lens for focusing the laser beam is arranged between the planar mirror and the discharge vessel.

3. The light source device according to claim 1, wherein a pair of electrodes is located inside of the discharge vessel.

4. The light source device according to claim 3, wherein the laser is for discharge maintenance and is one of a pulsed laser and a CW laser.

5. The light source device according to claim 1, further comprising a heating means for heating the discharge vessel.

6. The light source device according to claim 5, wherein the heating means is a laser beam absorbing heating element and is embedded in part of the discharge vessel.

7. The light source device according to claim 6, wherein the part of the discharge vessel in which the heating element is embedded is a sealing part of the discharge vessel.

* * * * *